United States Patent
Chen et al.

(10) Patent No.: US 8,511,880 B2
(45) Date of Patent: Aug. 20, 2013

(54) EDGE TYPE LIGHT SOURCE MODULE

(75) Inventors: Ming-Lung Chen, Taoyuan County (TW); Hao-Chung Hsu, Taipei County (TW); Wen-Chieh Liu, Taipei County (TW); Chih-Yu Yang, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 242 days.

(21) Appl. No.: 13/023,465

(22) Filed: Feb. 8, 2011

(65) Prior Publication Data

US 2012/0106199 A1 May 3, 2012

(30) Foreign Application Priority Data

Oct. 29, 2010 (TW) ................................ 99137279 A

(51) Int. Cl.
*F21V 7/04* (2006.01)
(52) U.S. Cl.
USPC ........... 362/613; 362/600; 362/611; 362/616; 362/617
(58) Field of Classification Search
USPC ............................ 362/600, 611, 613, 617, 616
See application file for complete search history.

(56) References Cited

U.S. PATENT DOCUMENTS 7,223,009 B2 5/2007 Henriet et al.

FOREIGN PATENT DOCUMENTS

EP 2081079 7/2009

*Primary Examiner* — Stephen F Husar
*Assistant Examiner* — Meghan Dunwiddie
(74) *Attorney, Agent, or Firm* — Jianq Chyun IP Office

(57) ABSTRACT

An edge type light source module has at least one middle light emitting region and edge light emitting region and includes a first edge type light emitting device and a second edge type light emitting device. If the middle light emitting region is a lighting region having a brightness value L1, the edge light emitting region adjacent to the lighting region is a light leakage region. The light leakage region has a predetermined brightness value L2, and a compensation brightness value L2' of the light leakage region satisfies $L2'=L2-(L1*k1*R1)$, $0 \leq k1 \leq 1$, and $20\% \leq R1 \leq 60\%$. If the edge light emitting region is a lighting region having a brightness value L3, the middle light emitting region adjacent to the lighting region is a light leakage region. The light leakage region has a predetermined brightness value L4, and a compensation brightness value L4' of the light leakage region satisfies $L4'=L4-(L3*k2*R2)$, $0 \leq k2 \leq 1$, and $10\% \leq R2 \leq 50\%$.

12 Claims, 5 Drawing Sheets

EDGE TYPE LIGHT SOURCE MODULE

CROSS-REFERENCE TO RELATED APPLICATION

This application claims the priority benefit of Taiwan application serial no. 99137279, filed on Oct. 29, 2010. The entirety of the above-mentioned patent application is hereby incorporated by reference herein and made a part of this specification.

BACKGROUND OF THE INVENTION

1. Field of the Invention

The present invention relates to an edge type light source module, and in particular, to an edge type light source module used in a liquid crystal display (LCD).

2. Description of Related Art

Since an LCD panel does not have a luminescent function, a backlight source module must be disposed under the LCD panel to provide a light source, so as to enable the LCD panel to achieve a purpose of display. Generally speaking, the backlight source module can be categorized into an edge type backlight source module and a direct type backlight source module.

As the LCD is gradually developed towards a trend of large dimension, the direct type backlight source module has been divided into M*N blocks at present, and according to image contents of each block, luminance of a backlight source corresponding to the each block is adjusted, which is a local dimming technology, so as to increase a contrast ratio of a picture.

However, the existing disadvantage of the current direct type backlight source module adopting the local dimming technology is an insufficient decreasing of brightness of a single region, so that image edges displayed by a display panel are not smooth enough. To solve the problem, the number of local regions of the direct type backlight source module is generally increased. However, the increasing the number of the local regions increases the cost, and also raises the drive complexity of the backlight source module.

SUMMARY OF THE INVENTION

Accordingly, the present invention is directed to an edge type light source module to solve a problem that image edges are not smooth enough in a local dimming technology of a direct type backlight source module.

The present invention provides an edge type light source module having a light emitting surface, and the light emitting surface has at least one middle light emitting region and at least one edge light emitting region. The edge type light source module includes a first edge type light emitting device and a second edge type light emitting device. A light generated by the first edge type light emitting device is emitted from the middle light emitting region. The second edge type light emitting device and the first edge type light emitting device are stacked together, and a light generated by the second edge type light emitting device is emitted from the edge light emitting region. If the middle light emitting region is a lighting region having a brightness value of L1, the edge light emitting region adjacent to the lighting region is a light leakage region. The light leakage region has a predetermined brightness value of L2, and a compensation brightness value (L2') of the light leakage region satisfies L2'=L2−(L1*k1*R1), where 0≦k1≦1, and 20% 60%. If the edge light emitting region is a lighting region having a brightness value of L3, the middle light emitting region adjacent to the lighting region is a light leakage region. The light leakage region has a predetermined brightness value of L4, and a compensation brightness value (L4') of the light leakage region satisfies L4'=L4−(L3*k2*R2), where 0≦k2≦1, and 10%≦R2≦50%.

The present invention further provides an edge type light source module having a light emitting surface, and the light emitting surface has a plurality of light emitting regions. The edge type light source module includes a first edge type light emitting device and a second edge type light emitting device. The second edge type light emitting device and the first edge type light emitting device are stacked together. If one of the light emitting regions is a lighting region having a brightness value of L5, the light emitting region adjacent to the lighting region is a first light leakage region. The first light leakage region has a predetermined brightness value of L6, and a compensation brightness value (L6') of the first light leakage region satisfies L6'=L5*R3, where 30%≦R3≦80%. Furthermore, the light emitting region adjacent to the first light leakage region is a second light leakage region. The second light leakage region has a predetermined brightness value of L7, and a compensation brightness value of L7' of the second light leakage region satisfies L7'=L5*R4, where 10%≦R4≦50%. If the compensation brightness value (L7') of the second light leakage region is greater than the predetermined brightness value (L7), the compensation brightness value (L7') is used as a target brightness value of the second light leakage region. If the compensation brightness value (L7') of the second light leakage region is less than the predetermined brightness value (L7), the predetermined brightness value (L7) is used as the target brightness value of the second light leakage region.

Based on the above, the present invention adopts a plurality of stacked edge type light emitting devices to form the edge type light source module of the local dimming. In particular, the present invention performs the brightness compensation on each region of the edge type light source module, so as to enable image edges to be smoother, thereby improving the fluency of dynamic images.

In order to make the aforementioned features and advantages of the present invention more comprehensible, embodiments are illustrated in detail below with reference to accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
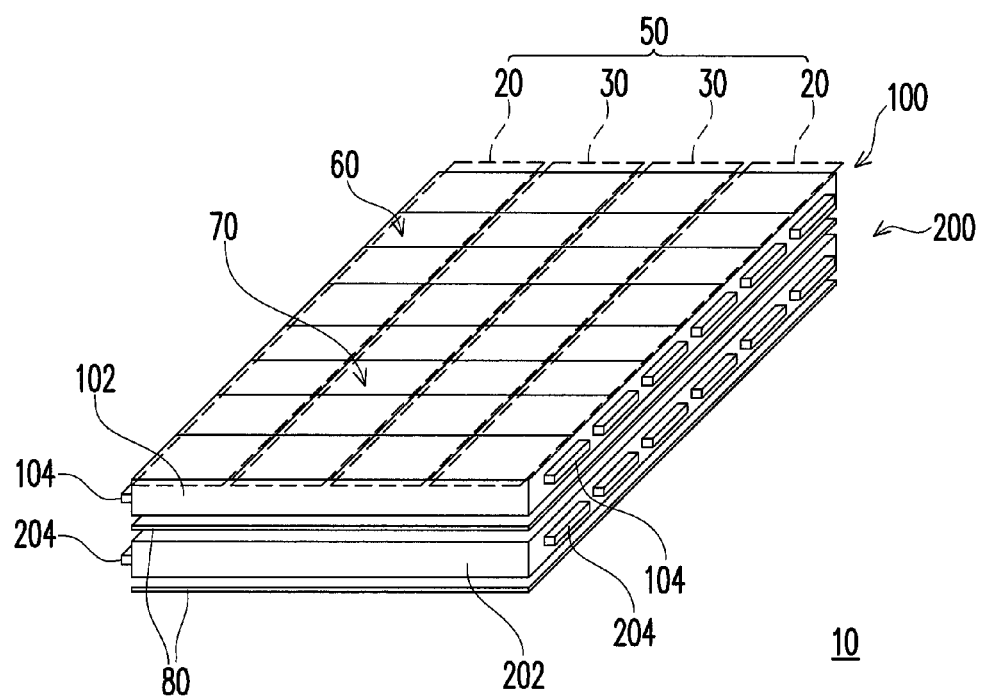
FIG. 1 is a schematic view of an edge type light source module according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2A:
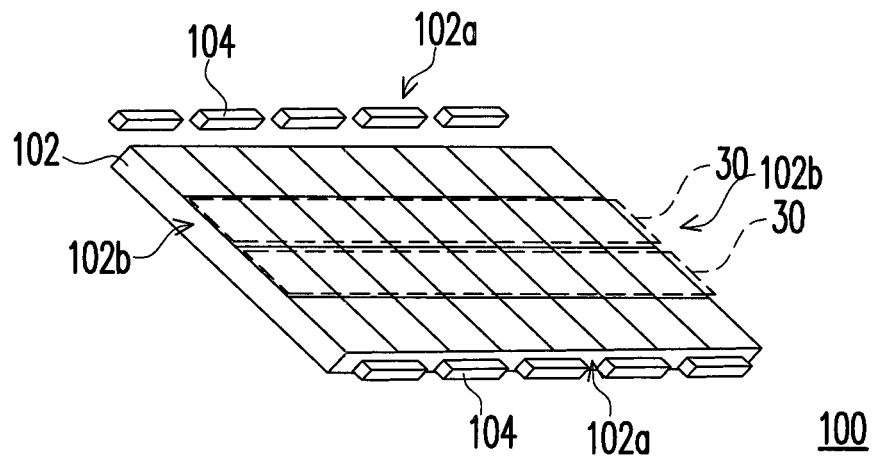
FIG. 2A is a schematic view of a first edge type light emitting device in the edge type light source module of FIG. 1.
Figure 2B:
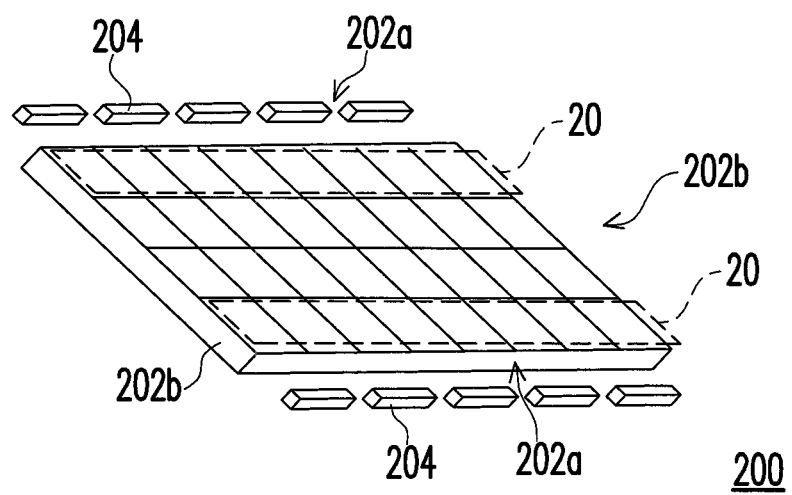
FIG. 2B is a schematic view of a second edge type light emitting device in the edge type light source module of FIG. 1.

FIG. 1 is a schematic view of an edge type light source module according to an embodiment of the present invention. FIG. 2A is a schematic view of a first edge type light emitting device in the edge type light source module of FIG. 1. FIG. 2B is a schematic view of a second edge type light emitting device in the edge type light source module of FIG. 1. Referring to FIG. 1, FIG. 2A, and FIG. 2B at the same time, in this embodiment, the edge type light source module 10 has a light emitting surface 50, and the light emitting surface 50 has at least one middle light emitting region 30 and at least one edge light emitting region 20.

The edge type light source module 10 includes a first edge type light emitting device 100 and a second edge type light emitting device 200, and the second edge type light emitting device 200 and the first edge type light emitting device 100 are stacked together. In other words, the second edge type light emitting device 200 may be stacked on the first edge type light emitting device 100, or the first edge type light emitting device 100 is stacked on the second edge type light emitting device 200. According to an exemplary embodiment, in the edge type light source module 10, an optical film 80 may be further disposed between the first edge type light emitting device 100 and the second edge type light emitting device 200, or above or below the second edge type light emitting device 200.

More specifically, the first edge type light emitting device 100 includes a first light guiding plate 102 and a plurality of first light sources 104. The first light guiding plate 102 has a plurality of side surfaces, and the side surface includes long side surfaces 102a and short side surfaces 102b. The material of the first light guiding plate 102 may be transparent acrylic or other appropriate light guiding materials. The first light sources 104 are disposed on at least one side surface of the first light guiding plate 102. In this embodiment, the first light sources 104 are disposed on two opposite side surfaces of the first light guiding plate 102, and preferably disposed on the long side surfaces 102a. The first light sources 104 may be Light Emitting Diode (LED) light sources or other luminescent light sources.

In particular, after a light of the first light source 104 is incident into the first light guiding plate 102, the light is emitted from the middle light emitting region 30 of the edge type light source module 10. It should be noted that, a method for emitting the light of the first light source 104 from the middle light emitting region 30 of the edge type light source module 10 is (for example) to fabricate a microstructure (not shown) in a specific position in the first light guiding plate 102. After being incident into the first light guiding plate 102, the light of the first light source 104 is delivered in a total reflection manner first, and until the light is incident upon the microstructure, the microstructure damages the total reflection mechanism of the light and the light is emitted from the first light guiding plate 102, so as to enable the light to be emitted from a specific region (the middle light emitting region 30). According to this embodiment, the light of the first light source 104 disposed on one side surface 102a of the first light guiding plate 102 is emitted from one of middle light emitting regions 30; while the light of the first light source 104 disposed on the other side surface 102a of the first light guiding plate 102 is emitted from the other middle light emitting region 30. Furthermore, each middle light emitting region 30 has a plurality of light emitting regions 70, and each light emitting region 70 corresponds to one first light source 104. In other words, the light emitted from each first light source 104 is emitted from a corresponding light emitting region 70.

Similarly, the second edge type light emitting device 200 includes a second light guiding plate 202 and a plurality of second light sources 204. The second light guiding plate 202 has a plurality of side surfaces, and the side surface includes a long side surface 202a and a short side surface 202b. The material of the second light guiding plate 202 may be transparent acrylic or other appropriate light guiding materials. The second light sources 204 are disposed on at least one side surface of the second light guiding plate 202. In this embodiment, the second light sources 204 are disposed on two opposite side surfaces of the second light guiding plate 202, and preferably disposed on the long side surfaces 202a. The second light sources 204 may be LED light sources or other luminescent light sources.

In particular, after the light of the second light source 204 is incident into the second light guiding plate 202, the light is emitted from the edge light emitting region 20 of the edge type light source module 10. Likewise, a method for emitting the light of the second light source 204 from the edge light emitting region 20 of the edge type light source module 10 is (for example) to fabricate a microstructure (not shown) in a specific position in the second light guiding plate 202. After being incident into the second light guiding plate 202, the light of the second light source 204 is delivered in the total reflection manner first, and until the light is incident upon the microstructure, the microstructure damages the total reflection mechanism of the light and the light is emitted from the second light guiding plate 202, so as to enable the light to be emitted from a specific region (the edge light emitting region 20). According to this embodiment, the light of the second light source 204 disposed on one side surface 202a of the second light guiding plate 202 is emitted from one of edge light emitting regions 20; while the light of the second light source 204 disposed on the other side surface 202a of the second light guiding plate 202 is emitted from the other edge light emitting region 20. Furthermore, each edge light emitting region 20 has a plurality of light emitting regions 60, and each light emitting region 60 corresponds to one second light source 204. In other words, the light emitted from each second light source 204 is emitted from one corresponding light emitting region 60.

The present invention imposes no limitation on the numbers of the middle light emitting regions 30 and the edge light emitting regions 20. The numbers are relevant to the number of the edge type light emitting devices stacked in the light source module, and also relevant to the light source disposed on the edge of the light guiding plate. The present invention does not impose limitation on the numbers of the first light sources 104 and the second light sources 204 either. Practically, the numbers of the first light sources 104 and the second light sources 204 are relevant to the dimension of the light source module (or a display panel), the number of divided regions of the light source module, and other related factors.

Furthermore, the numbers of the light emitting regions 60 and 70 are relevant to the numbers of the first light sources 104 and the second light sources 204.

Based on the above, the edge type light source module of this embodiment may achieve a purpose of local dimming. In particular, the present invention adopts the edge type light source module to perform the local dimming, and all lights generated by the light source are emitted after light guiding through the light guiding plate. A conventional direct type backlight source module of the local dimming achieves a purpose of the local dimming by controlling switch-on and switch-off of an LED light source in each region, and thus the brightness difference between each region and an adjacent region is obvious. Therefore, compared with the conventional direct type backlight source module of the local dimming, the edge type light source module of the present invention enables image edges of the display panel to be smoother.

Generally speaking, when the edge type light source module of the local dimming is running, a condition of light leakage may occur in a place where the light passes, thus resulting in decrease of a contrast in the place. Furthermore, when the local dimming is performed, the light of a dimming region (also referred to as the lighting region) may be leaked to an adjacent region, thus resulting in decrease of a contrast in a light leakage region. Therefore, in this embodiment, in order to enable the edge type light source module of the local dimming of this embodiment to have a more preferable contrast and improve fluency of dynamic images, brightness compensation is further performed on the edge type light source module of the local dimming, which is described as follows.

Figure 3:
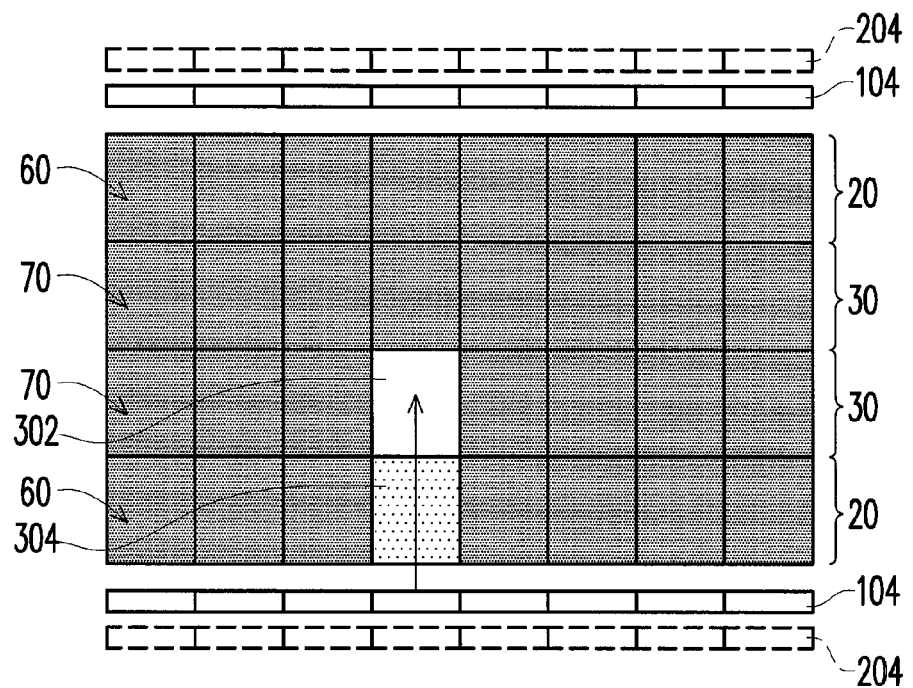
FIG. 3 is a schematic view of a lighting region and a light leakage region of an edge type light source module according to an embodiment of the present invention.

FIG. 3 is a schematic view of a lighting region and a light leakage region of an edge type light source module according to an embodiment of the present invention. FIG. 3 is a schematic top view of the edge type light source module of FIG. 1. In order to clearly illustrate this embodiment, in FIG. 3, a first light source 104 and a second light source 204 are drawn into a form of two lines, but practically, the first light source 104 and the second light source 204 are stacked together up and down. After a light (as shown with an arrow) generated by one of first light sources 104 of a first edge type light emitting device 100 is incident into a first light guiding plate 102, the light is emitted from one of light emitting regions 70 of a middle light emitting region 30, in which the light emitting region 70 herein is defined as a lighting region 302 having a brightness value of L1. At this time, when the first light source 104 is passing through a light emitting region 60 of an edge light emitting region 20, light leakage occurs in the light emitting region 60. The light emitting region 60 herein is defined as a light leakage region 304.

If a previously predetermined brightness value of the light leakage region 304 is L2, the light leakage occurring when the first light source 104 is passing through the light emitting region 60 contributes to a certain extent of the brightness of the light emitting region 60 (the light leakage region 304) in the edge light emitting region 20. Therefore, in this embodiment, the brightness of the light emitting region 60 (the light leakage region 304) is compensated, that is, the brightness of the light leakage region 304 is adjusted, so as to enable a compensation brightness value of L2' of the light emitting region 60 (the light leakage region 304) to approximate a target brightness value. The compensation manner is:

$$L2'=L2-(L1*k1*R1)$$

$$0<k1\leq 1$$

$$20\%\leq R1\leq 60\%$$

In other words, in this embodiment, the compensation manner is to subtract a light leakage brightness value from the previously predetermined brightness value (L2) of the light emitting region 60 (the light leakage region 304) in the edge light emitting region 20, and use the compensation brightness value (L2') as the target brightness value of the light emitting region 60 (the light leakage region 304) in the edge light emitting region 20. In this way, the edge type light source module of the local dimming is enabled to have a preferable brightness distribution, so as to improve smoothness of image edges and fluency of dynamic images.

Figure 4:
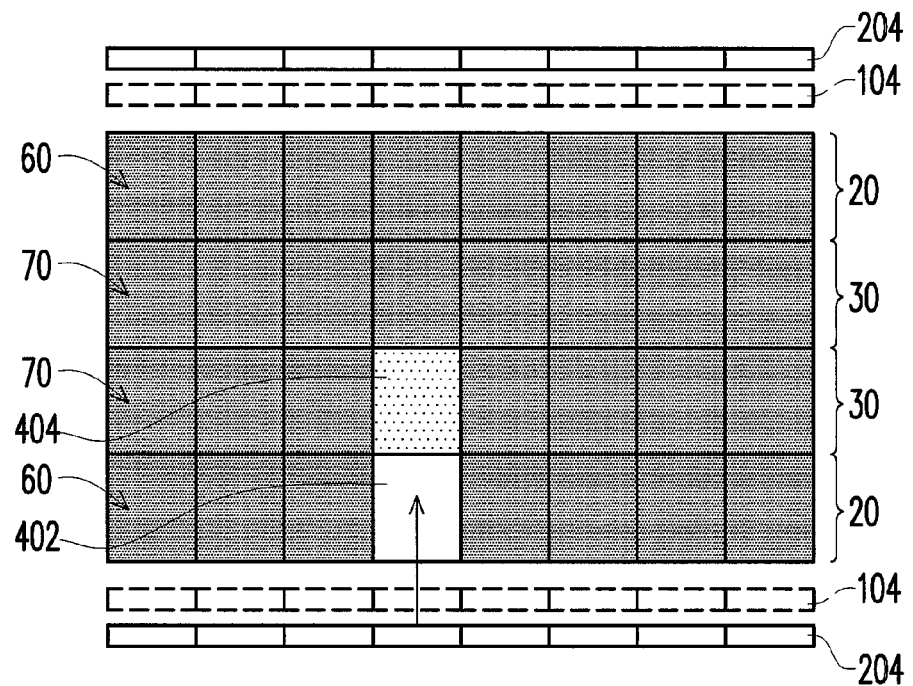
FIG. 4 is a schematic view of a lighting region and a light leakage region of an edge type light source module according to another embodiment of the present invention.

FIG. 4 is a schematic view of a lighting region and a light leakage region of an edge type light source module according to an embodiment of the present invention. FIG. 4 is a schematic top view of the edge type light source module of FIG. 1. After a light (as shown with an arrow) generated by one of second light sources 204 of a second edge light device 200 is incident into a second light guiding plate 202, the light is emitted from one of light emitting regions 60 of an edge light emitting region 20, in which the light emitting region 60 herein is defined as a lighting region 402 having a brightness value of L3. At this time, some of the light is leaked from the lighting region 402 to an adjacent middle light emitting region 30 (a light emitting region 70). The light emitting region 70 herein is defined as a light leakage region 404.

If a previously predetermined brightness value of the light leakage region 404 is L4, the light leakage of the lighting region 402 contributes to a certain extent of the brightness of the light emitting region 70 (the light leakage region 404) in the middle light emitting region 30. Therefore, in this embodiment, the brightness of the light leakage region 404 is compensated, that is, the brightness of the light leakage region 404 is adjusted, so as to enable a compensation brightness value of L4' of the light emitting region 70 (the light leakage region 404) in the middle light emitting region 30 to approximate a target brightness value. The compensation manner is:

$$L4'=L4-(L3*k2*R2)$$

$$0<k21\leq 1$$

$$10\%\leq R2\leq 50\%$$

In other words, in this embodiment, the compensation manner is to subtract a light leakage brightness value from the previously predetermined brightness value (L4) of the light emitting region 70 (the light leakage region 404) in the middle light emitting region 30, and use the compensation brightness value (L4') as the target brightness value of the light emitting region 70 (the light leakage region 404) in the middle light emitting region 30. In this way, the edge type light source module of the local dimming is enabled to have a preferable brightness distribution, so as to improve smoothness of image edges and fluency of dynamic images.

Figure 5:
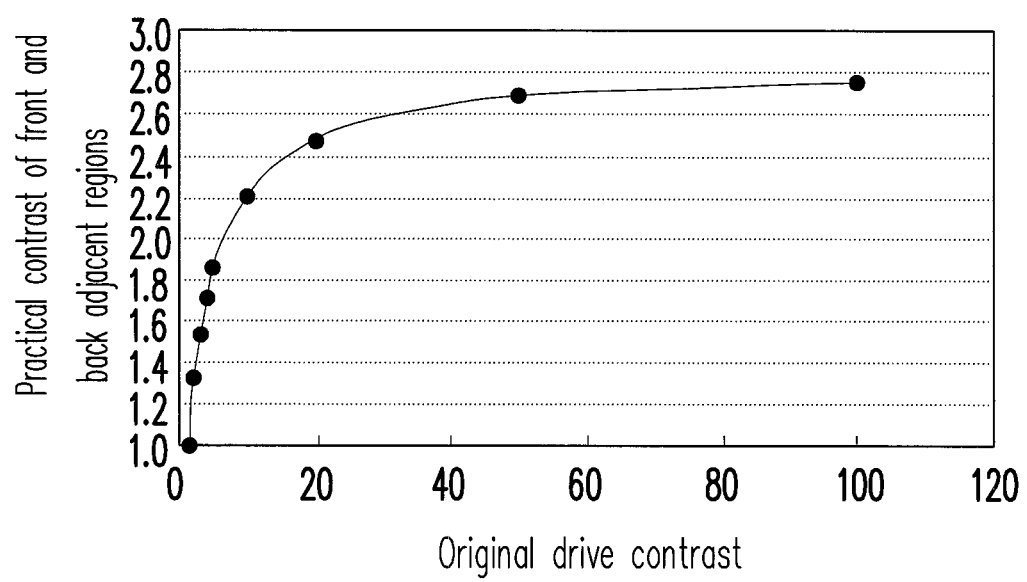
FIG. 5 is a relationship diagram of a drive contrast and a practical contrast of an edge type light source module according to an embodiment of the present invention.

FIG. 5 is a relationship diagram of a drive contrast and a practical contrast of an edge type light source module according to an embodiment of the present invention. Referring to FIG. 5, a horizontal axis represents an original drive contrast of an edge type light source module of local dimming, and a vertical axis represents a practical contrast of front and back adjacent regions of the edge type light source module of the local dimming. It may be known from FIG. 5 that the original drive contrast (the horizontal axis) and the practical contrast of the front and back adjacent regions (the vertical axis) are not in a linear relationship, which mainly results from a problem of light leakage from the front and back adjacent regions.

Therefore, in this embodiment, the compensation method as shown in FIG. 3 and FIG. 4 is adopted, that is, corresponding compensation or adjustment is performed on the brightness of the light leakage region. In this way, the edge type light source module of the local dimming of this embodiment is enabled to have a preferable brightness distribution, so as to improve smoothness of image edges and fluency of dynamic images.

In the embodiments of FIG. 3 and FIG. 4, the bright compensation is performed on adjacent light emitting regions along a direction of advance of a first light source 104/a second light source 204 (or referred to as a main light emitting path of the light source). However, the present invention also provides a method for compensating the adjacent light emitting regions along a direction of arrangement of the first light source 104/the second light source 204, which is illustrated as follows.

Figure 6:
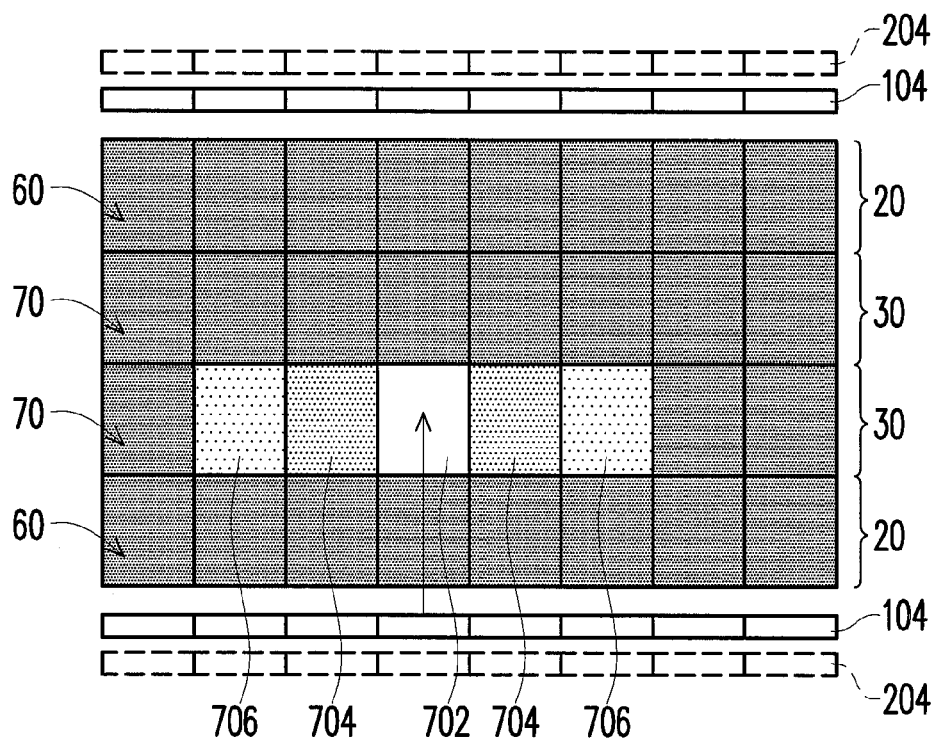
FIG. 6 is a schematic view of a lighting region and a first and a second light leakage regions of an edge type light source module according to an embodiment of the present invention.
Figure 7:
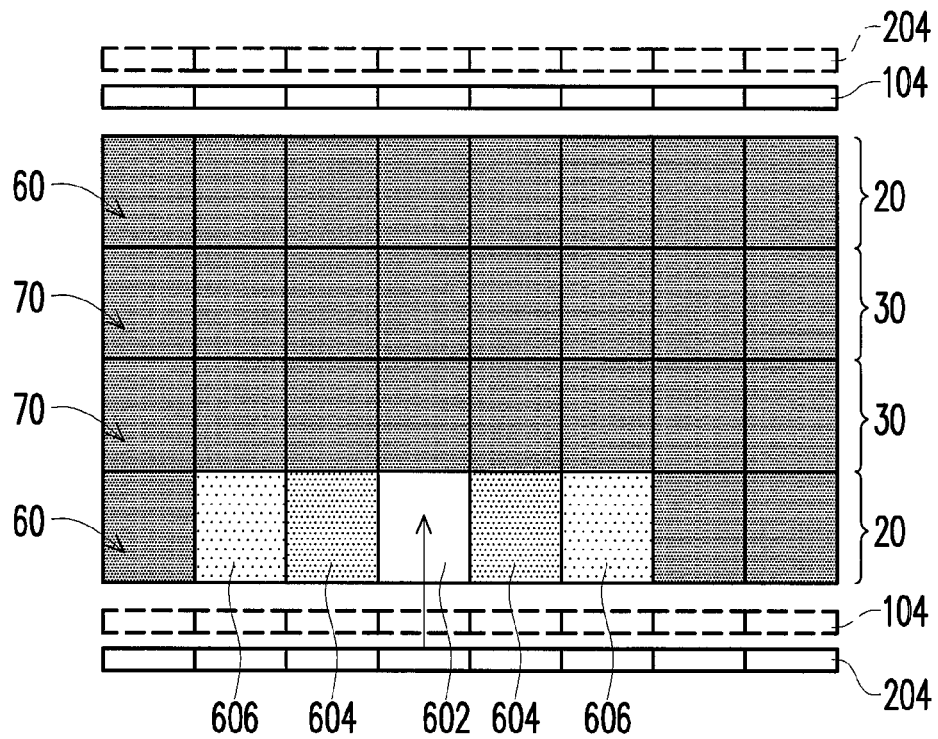
FIG. 7 is a schematic view of a lighting region and a first and a second light leakage regions of an edge type light source module according to another embodiment of the present invention.

FIG. 6 and FIG. 7 are schematic views of a lighting region and a first and a second light leakage regions of an edge type light source module according to embodiments of the present invention respectively. FIG. 6 is a schematic top view of the edge type light source module of FIG. 1. The edge type light source module has at least one middle light emitting region 30 and at least one edge light emitting region 20. A light generated by a first edge type light emitting device 100 is emitted from the middle light emitting region 30, and a light emitted from each first light source 104 of the first edge type light emitting device 100 is emitted from a corresponding light emitting region 70. A light generated by a second edge type light emitting device 200 is emitted from the edge light emitting region 20, and a light emitted from each second light source 204 of the second edge type light emitting device 200 is emitted from a corresponding light emitting region 60.

The light (as shown with an arrow) generated by the first light source 104 of the first edge type light emitting device 100 is incident into a first light guiding plate 102, and is emitted from one of light emitting regions 70 of the middle light emitting region 30. In this embodiment, the light emitting region 70 of the middle light emitting region 30 is preferably a light emitting region having a maximum brightness value of the middle light emitting region 30, but the present invention is not limited thereto. When one of light emitting regions 70 of the middle light emitting region 30 is a lighting region 702 having a brightness value of L5, some of the light is leaked from the lighting region 702 to light emitting regions 70 at both sides, and the light emitting region 60 with light leakage is defined herein as a first light leakage region 704.

If a previously predetermined brightness value of the first light leakage region 704 is L6, the light leakage of the lighting region 702 contributes to a certain extent of the brightness of the light emitting region 70 (the first light leakage region 704). Therefore, in this embodiment, the brightness of the first light leakage region 704 is compensated, that is, the brightness of the first light leakage region 704 is adjusted, so as to enable a compensation brightness value of L6' of the light emitting region 70 (the first light leakage region 704) to approximate a target brightness value. The compensation manner is:

$$L6'=L5*R3$$

$$30\% \leq R3 \leq 80\%$$

Furthermore, the light may be further leaked from the lighting region 702 to the light emitting region 70 at an edge of the first light emitting region 704, and the light emitting region 70 located at the edge of the first light leakage region 704 is defined herein as a second light leakage region 706. If a previously predetermined brightness value of the second light leakage region 706 is L7, the light leakage of the lighting region 702 may also contribute to a certain extent of the brightness of the light emitting region 70 (the second light leakage region 706). Therefore, in this embodiment, the brightness of the second light leakage region 706 is compensated, that is, the brightness of the second light leakage region 706 is adjusted, so as to enable a compensation brightness value of L7' of the light emitting region 70 (the second light leakage region 706) to approximate a target brightness value. The compensation manner is that the compensation brightness value of the second light leakage region 706 is L7'=L5*R4, where 10%≦R4≦50%.

If the compensation brightness value of L7' of the second light leakage region 706 is greater than the predetermined brightness value of L7, the second light leakage region 706 uses the compensation brightness value of L7' as the target brightness value.

If the compensation brightness value of L7' of the second light leakage region 706 is less than the predetermined brightness value of L7, the second light leakage region 706 uses the predetermined brightness value of L7 as the target brightness value.

In other words, in this embodiment, as for the first light leakage region 704, the compensation manner is that the brightness value (L5) of the lighting region 702 is multiplied by a specific compensation proportion (30% to 80%) and the compensation brightness value (L6') is used as the target brightness value of the light emitting region 70 (the first light leakage region 704).

Furthermore, as for the second light leakage region 706, the compensation manner is that the brightness value (L5) of the lighting region 702 multiplied by a specific compensation proportion (10% to 50%) to be used as the compensation brightness value (L6') of the light emitting region 70 (the second light leakage region 706). In particular, if the compensation brightness value (L7') of the second light leakage region 706 is greater than the predetermined brightness value (L7), the compensation is performed. If the compensation brightness value (L7) of the second light leakage region 706 is less than the predetermined brightness value (L7), the compensation is not performed.

Then, referring to FIG. 7, after a light (as shown with an arrow) generated by a second light source 204 of a second edge type light emitting device 200 is incident into a second light guiding plate 202, the light is emitted from one of light emitting regions 60 of an edge light emitting region 20, in which the light emitting region 60 of the edge light emitting region 20 is defined herein as a lighting region 602 having a brightness value of L5. In this embodiment, the light emitting region 60 of the edge light emitting region 20 is preferably a light emitting region having a maximum brightness value of the edge light emitting region 20, but the present invention is not limited thereto. At this time, some of the light is leaked from the lighting region 602 to light emitting regions 60 at both sides, and the light emitting region 60 having the light leakage is defined herein as a first light leakage region 604.

If a previously predetermined brightness value of the first light leakage region 604 is L6, the light leakage of the lighting region 602 contributes to a certain extent of the brightness of the light emitting region 60 (the first light leakage region 604). Therefore, in this embodiment, the brightness of the first light leakage region 604 is compensated, that is, the brightness of the first light leakage region 604 is adjusted, so as to enable a compensation brightness value of L6' of the light emitting region 60 (the first light leakage region 604) to approximate a target brightness value. The compensation manner is:

$$L6'=L5*R3$$

$$30\% \leq R3 \leq 80\%$$

Furthermore, the light may be further leaked from the lighting region 602 to the light emitting region 60 at an edge of the first light leakage region 604. Herein, the light emitting region 60 located at the edge of the first light leakage region 604 is defined as a second light leakage region 606. If a previously predetermined brightness value of the second light leakage region 606 is L7, the light leakage of the lighting region 602 may contribute to a certain extent of the brightness of the light emitting region 60 (the second light leakage region 606). Therefore, in this embodiment, the brightness of the second light leakage region 606 is compensated, that is, the brightness of the second light leakage region 606 is adjusted, so as to enable a compensation brightness value of L7' of the light emitting region 60 (the second light leakage region 606) to approximate the target brightness value. The compensation manner is that the compensation brightness value of the second light leakage region 606 is L7'=L5*R4, where $10\% \leq R4 \leq 50\%$.

If the compensation brightness value of L7' of the second light leakage region 606 is greater than the predetermined brightness value of L7, the compensation brightness value of L7' is used as the target brightness value of the second light leakage region 606.

If the compensation brightness value of L7' of the second light leakage region 606 is less than the predetermined brightness value of L7, the predetermined brightness value of L7 us used as the target brightness value of the second light leakage region 606.

In other words, in this embodiment, as for the first light leakage region 604, the compensation manner is that the brightness value (L5) of the lighting region 602 is multiplied by a specific compensation proportion (30% to 80%) and the compensation brightness value (L6') is used as the target brightness value of the light emitting region 60 (the first light leakage region 604).

Furthermore, as for the second light leakage region 606, the compensation manner is that the brightness value (L5) of the lighting region 602 is multiplied by a specific compensation proportion (10% to 50%) to be used as the compensation brightness value (L6') of the light emitting region 60 (the second light leakage region 606). In particular, if the compensation brightness value (L7') of the second light leakage region 606 is greater than the predetermined brightness value (L7), the compensation is performed. If the compensation brightness value (L7') of the second light leakage region 606 is less than the predetermined brightness value (L7), the compensation is not performed.

In this way, the edge type light source module of the local dimming is enabled to have a preferable brightness distribution, so as to improve smoothness of image edges and fluency of dynamic images.

In the embodiments of FIG. 3 and FIG. 4, the brightness compensation is performed on adjacent light emitting regions along a direction of advance of a first light source 104/a second light source 204. In the embodiments of FIG. 6 and FIG. 7, the brightness compensation is performed on adjacent light emitting regions along a direction of arrangement of the first light source 104/the second light source 204. According to an embodiment of the present invention, the embodiments of FIG. 3 and FIG. 4 and the embodiments of FIG. 6 and FIG. 7 are combined, that is to say, the brightness compensation is not only performed on the adjacent light emitting regions along the direction of advance of the first light source 104/the second light source 204 but also performed on the adjacent light emitting regions along the direction of arrangement of the first light source 104/the second light source 204.

In conclusion, the present invention adopts a plurality of stacked edge type light emitting devices to form an edge type light source module of the local dimming, and performs the brightness compensation on each region of the edge type light source module, so as to enable image edges to be smoother, and thereby improving fluency of dynamic images. Compared with a display adopting the direct type light emitting device of the local dimming, a display adopting the edge type light emitting device of the local dimming of the present invention presents an image with a more preferable display quality.

The present invention is disclosed above with the embodiments which are not intended to limit the present invention. Modifications and variations made by persons of ordinary skill in the art without departing from the spirit and the scope of the present invention should fall within the protection scope of the present invention as defined by the claim.

What is claimed is:

1. An edge type light source module having a light emitting surface, the light emitting surface comprising at least one middle light emitting region and at least one edge light emitting region, the edge type light source module comprising:
   a first edge type light emitting device, wherein a light generated by the first edge type light emitting device is emitted from the middle light emitting region; and
   a second edge type light emitting device, stacked with the first edge type light emitting device, wherein a light generated by the second edge type light emitting device is emitted from the edge light emitting region, wherein
   if the middle light emitting region is a lighting region with a brightness value of L1, the edge light emitting region adjacent to the lighting region is a light leakage region, a predetermined brightness value of the light leakage region is L2, and a compensation brightness value (L2') of the light leakage region satisfies L2'=L2−(L1*k1*R1), where L1*k1*R1 is a first light leakage brightness value, k1 is a first compensation ratio, R1 is a first compensation proportion, $0 < k1 \leq 1$, and $20\% \leq R1 \leq 60\%$, and
   if the edge light emitting region is a lighting region with a brightness value of L3, the middle light emitting region adjacent to the lighting region is a light leakage region, a predetermined brightness value of the light leakage region is L4, and a compensation brightness value (L4') of the light leakage region satisfies L4'=L4−(L3*k2*R2), where L3*k2*R2 is a second light leakage brightness value, k2 is a second compensation ratio, R1 is a second compensation proportion, $0 < k2 \leq 1$, and $10\% \leq R2 \leq 50\%$.

2. The edge type light source module according to claim 1, wherein the first edge type light emitting device comprises:
   a first light guiding plate, comprising a plurality of side surfaces; and
   a plurality of first light sources, disposed on at least one side surface of the first light guiding plate, wherein after being incident into the first light guiding plate, lights of the first light sources are emitted from the middle light emitting region.

3. The edge type light source module according to claim 2, wherein the first light sources are disposed on two opposite side surfaces of the first light guiding plate.

4. The edge type light source module according to claim 1, wherein the second edge type light emitting device comprises:
- a second light guiding plate, comprising a plurality of side surfaces; and
- a plurality of second light sources, disposed on at least one side surface of the second light guiding plate, wherein after being incident into the second light guiding plate, lights of the second light sources are emitted from the edge light emitting region.

5. The edge type light source module according to claim 4, wherein the second light sources are disposed on two opposite side surfaces of the second light guiding plate.

6. An edge type light source module with a light emitting surface, wherein the light emitting surface comprises a plurality of light emitting regions, the edge type light source module comprising:
- a first edge type light emitting device; and
- a second edge type light emitting device, stacked with the first edge type light emitting device, wherein
- if one of the light emitting regions is a lighting region with a brightness value of L5, the edge light emitting region adjacent to the lighting region is a first light leakage region, a predetermined brightness value of the first light leakage region is L6, and a compensation brightness value (L6') of the first light leakage region satisfies L6'=L5*R3, where 30%≦R3≦80%, and R3 is a third compensation proportion, and
- the light emitting region adjacent to the first light leakage region is a second light leakage region, and a predetermined brightness value of the second light leakage region is L7, a compensation brightness value of L7' of the second light leakage region satisfies L7'=L5*R4, where 10%≦R4≦50%, and R4 is a fourth compensation proportion,
- if the compensation brightness value (L7') of the second light leakage region is greater than the predetermined brightness value (L7), the compensation brightness value (L7') is used as a target brightness value of the second light leakage region; and
- if the compensation brightness value (L7') of the second light leakage region is less than the predetermined brightness value (L7), the predetermined compensation brightness value (L7) is used as the target brightness value the second light leakage region.

7. The edge type light source module according to claim 6, wherein the first edge type light emitting device comprises:
- a first light guiding plate, comprising a plurality of side surfaces; and
- a plurality of first light sources, disposed on at least one side surface of the first light guiding plate, wherein after being incident into the first light guiding plate, lights of the first light sources are emitted from a corresponding light emitting region.

8. The edge type light source module according to claim 7, wherein the first light sources are disposed on two opposite side surfaces of the first light guiding plate.

9. The edge type light source module according to claim 7, wherein the side surfaces of the first light guiding plate comprise a plurality of long side surfaces and a plurality of short side surfaces, the first light sources are disposed on the long side surfaces, and each first light source is disposed corresponding to one of the light emitting regions.

10. The edge type light source module according to claim 6, wherein the second edge type light emitting device comprises:
- a second light guiding plate, comprising a plurality of side surfaces; and
- a plurality of second light sources, disposed on at least one side surface of the second light guiding plate, wherein after being incident into the second light guiding plate, lights of the second light sources are emitted from a corresponding light emitting region.

11. The edge type light source module according to claim 10, wherein the second light sources are disposed on two opposite side surfaces of the second light guiding plate.

12. The edge type light source module according to claim 10, wherein the side surfaces of the second light guiding plate comprise a plurality of long side surfaces and a plurality of short side surfaces, the second light sources are disposed on the long side surfaces, and each second light source is disposed corresponding to one of the light emitting regions.

* * * * *